(12) United States Patent
Sandrew et al.

(10) Patent No.: US 9,007,365 B2
(45) Date of Patent: Apr. 14, 2015

(54) LINE DEPTH AUGMENTATION SYSTEM AND METHOD FOR CONVERSION OF 2D IMAGES TO 3D IMAGES

(71) Applicant: Legend 3D, Inc., Carlsbad, CA (US)

(72) Inventors: Barry Sandrew, San Diego, CA (US); Jared Sandrew, San Diego, CA (US); Jill Hunt, San Diego, CA (US); Tony Baldridge, San Diego, CA (US); James Prola, San Diego, CA (US)

(73) Assignee: Legend3D, Inc., Carlsbad, CA (US)

( * ) Notice: Subject to any disclaimer, the term of this patent is extended or adjusted under 35 U.S.C. 154(b) by 218 days.

(21) Appl. No.: 13/686,907

(22) Filed: Nov. 27, 2012

(65) Prior Publication Data

US 2014/0146037 A1    May 29, 2014

(51) Int. Cl.
 *G06T 15/20* (2011.01)
 *H04N 13/02* (2006.01)

(52) U.S. Cl.
 CPC .................................. *H04N 13/026* (2013.01)

(58) Field of Classification Search
 CPC .................................................... H04N 13/026
 USPC .................. 345/419, 420, 421; 382/186, 187; 348/370
 See application file for complete search history.

(56) References Cited

U.S. PATENT DOCUMENTS

| | | | |
|---|---|---|---|
| 2,593,925 A | 4/1952 | Sheldon | |
| 2,799,722 A | 7/1957 | Neugebauer | |
| 2,804,500 A | 8/1957 | Giacoletto | |
| 2,874,212 A | 2/1959 | Bechley | |
| 2,883,763 A | 4/1959 | Schaper | |
| 2,974,190 A | 3/1961 | Fine et al. | |
| 3,005,042 A | 10/1961 | Horsley | |
| 3,258,528 A | 6/1966 | Oppenheimer | |

(Continued)

FOREIGN PATENT DOCUMENTS

| | | |
|---|---|---|
| DE | 003444353 | 6/1986 |
| EP | 0302454 | 2/1989 |

(Continued)

OTHER PUBLICATIONS

International Search Report Issued for PCT/US2013/072208, dated Feb. 27, 2014, 6 pages.

(Continued)

*Primary Examiner* — Phu K Nguyen
(74) *Attorney, Agent, or Firm* — ARC IP Law, PC; Joseph J. Mayo (57) ABSTRACT

A line depth augmentation system and method for conversion of 2D images to 3D images. Enables adding depth to regions by altering depth of lines in the regions, for example in cell animation images or regions of limited color range. Eliminates creation of wireframe or other depth models and complex modeling of regions to match the depth of lines therein. Enables rapid conversion of two-dimensional images to three-dimensional images by enabling stereographers to quickly add/alter line depth without artifacts in images for example lines in monochrome regions. Embodiments may output a stereoscopic image pair of images with lines having desired depth, or any other three-dimensional viewing enabled image, such as an anaglyph image. Although the lines may be of a different depth than the region they appear in, the human mind interprets the monochromatic region as having depth associated with the line.

20 Claims, 8 Drawing Sheets
(6 of 8 Drawing Sheet(s) Filed in Color)

(56) References Cited

U.S. PATENT DOCUMENTS

| | | |
|---|---|---|
| 3,486,242 A | 12/1969 | Aronson |
| 3,551,589 A | 12/1970 | Moskoviz |
| 3,558,811 A | 1/1971 | Montevecchio et al. |
| 3,560,644 A | 2/1971 | Petrocelli et al. |
| 3,595,987 A | 7/1971 | Vlahos |
| 3,603,962 A | 9/1971 | Lechner |
| 3,612,755 A | 10/1971 | Tadlock |
| 3,617,626 A | 11/1971 | Bluth et al. |
| 3,619,051 A | 11/1971 | Wright |
| 3,621,127 A | 11/1971 | Hope |
| 3,647,942 A | 3/1972 | Siegel |
| 3,673,317 A | 6/1972 | Newell et al. |
| 3,705,762 A | 12/1972 | Ladd et al. |
| 3,706,841 A | 12/1972 | Novak |
| 3,710,011 A | 1/1973 | Altemus et al. |
| 3,731,995 A | 5/1973 | Reiffel |
| 3,737,567 A | 6/1973 | Kratomi |
| 3,742,125 A | 6/1973 | Siegel |
| 3,761,607 A | 9/1973 | Hanseman |
| 3,769,458 A | 10/1973 | Driskell |
| 3,770,884 A | 11/1973 | Curran et al. |
| 3,770,885 A | 11/1973 | Curran et al. |
| 3,772,465 A | 11/1973 | Vlahos et al. |
| 3,784,736 A | 1/1974 | Novak |
| 3,848,856 A | 11/1974 | Reeber et al. |
| 3,851,955 A | 12/1974 | Kent et al. |
| 3,971,068 A | 7/1976 | Gerhardt et al. |
| 3,972,067 A | 7/1976 | Peters |
| 4,017,166 A | 4/1977 | Kent et al. |
| 4,021,841 A | 5/1977 | Weinger |
| 4,021,846 A | 5/1977 | Roese |
| 4,054,904 A | 10/1977 | Saitoh et al. |
| 4,149,185 A | 4/1979 | Weinger |
| 4,168,885 A | 9/1979 | Kent et al. |
| 4,183,046 A | 1/1980 | Daike et al. |
| 4,183,633 A | 1/1980 | Kent et al. |
| 4,189,743 A | 2/1980 | Schure et al. |
| 4,189,744 A | 2/1980 | Stern |
| 4,235,503 A | 11/1980 | Condon |
| 4,258,385 A | 3/1981 | Greenberg et al. |
| 4,318,121 A | 3/1982 | Taite et al. |
| 4,329,710 A | 5/1982 | Taylor |
| 4,334,240 A | 6/1982 | Franklin |
| 4,436,369 A | 3/1984 | Bukowski |
| 4,475,104 A | 10/1984 | Shen et al. |
| 4,544,247 A | 10/1985 | Ohno |
| 4,549,172 A | 10/1985 | Welk |
| 4,558,359 A | 12/1985 | Kuperman et al. |
| 4,563,703 A | 1/1986 | Taylor |
| 4,590,511 A | 5/1986 | Bocchi et al. |
| 4,600,919 A | 7/1986 | Stern |
| 4,603,952 A | 8/1986 | Sybenga |
| 4,606,625 A | 8/1986 | Geshwind |
| 4,608,596 A | 8/1986 | Williams et al. |
| 4,617,592 A | 10/1986 | MacDonald |
| 4,642,676 A | 2/1987 | Weinger |
| 4,645,459 A | 2/1987 | Graf et al. |
| 4,647,965 A | 3/1987 | Imsand |
| 4,694,329 A | 9/1987 | Belmares-Sarabia et al. |
| 4,697,178 A | 9/1987 | Heckel |
| 4,700,181 A | 10/1987 | Maine et al. |
| 4,721,951 A | 1/1988 | Holler |
| 4,723,159 A | 2/1988 | Imsand |
| 4,725,879 A | 2/1988 | Eide et al. |
| 4,755,870 A | 7/1988 | Markle et al. |
| 4,758,908 A | 7/1988 | James |
| 4,760,390 A | 7/1988 | Maine et al. |
| 4,774,583 A | 9/1988 | Kellar et al. |
| 4,794,382 A | 12/1988 | Lai et al. |
| 4,809,065 A | 2/1989 | Harris et al. |
| 4,827,255 A | 5/1989 | Ishii |
| 4,847,689 A | 7/1989 | Yamamoto et al. |
| 4,862,256 A | 8/1989 | Markle et al. |
| 4,888,713 A | 12/1989 | Falk |
| 4,903,131 A | 2/1990 | Lingemann et al. |
| 4,918,624 A | 4/1990 | Moore et al. |
| 4,925,294 A | 5/1990 | Geshwind et al. |
| 4,933,670 A | 6/1990 | Wislocki |
| 4,952,051 A | 8/1990 | Lovell et al. |
| 4,965,844 A | 10/1990 | Oka |
| 4,984,072 A | 1/1991 | Sandrew |
| 5,002,387 A | 3/1991 | Baljet et al. |
| 5,038,161 A | 8/1991 | Ki |
| 5,050,984 A | 9/1991 | Geshwind |
| 5,093,717 A | 3/1992 | Sandrew |
| 5,177,474 A | 1/1993 | Kadota |
| 5,181,181 A | 1/1993 | Glynn |
| 5,185,852 A | 2/1993 | Mayer |
| 5,237,647 A | 8/1993 | Roberts et al. |
| 5,252,953 A | 10/1993 | Sandrew et al. |
| 5,262,856 A | 11/1993 | Lippman et al. |
| 5,328,073 A | 7/1994 | Blanding et al. |
| 5,341,462 A | 8/1994 | Obata |
| 5,347,620 A | 9/1994 | Zimmer |
| 5,402,191 A | 3/1995 | Dean et al. |
| 5,428,721 A | 6/1995 | Sato et al. |
| 5,481,321 A | 1/1996 | Lipton |
| 5,495,576 A | 2/1996 | Ritchey |
| 5,528,655 A | 6/1996 | Umetani et al. |
| 5,534,915 A | 7/1996 | Sandrew |
| 5,684,715 A | 11/1997 | Palmer |
| 5,699,444 A | 12/1997 | Palm |
| 5,717,454 A | 2/1998 | Adolphi et al. |
| 5,729,471 A | 3/1998 | Jain et al. |
| 5,739,844 A | 4/1998 | Kuwano et al. |
| 5,742,291 A | 4/1998 | Palm |
| 5,748,199 A | 5/1998 | Palm |
| 5,767,923 A | 6/1998 | Coleman |
| 5,778,108 A | 7/1998 | Coleman |
| 5,784,175 A | 7/1998 | Lee |
| 5,784,176 A | 7/1998 | Narita |
| 5,825,997 A | 10/1998 | Yamada et al. |
| 5,835,163 A | 11/1998 | Liou et al. |
| 5,841,512 A | 11/1998 | Goodhill |
| 5,867,169 A | 2/1999 | Prater |
| 5,880,788 A | 3/1999 | Bregler |
| 5,899,861 A | 5/1999 | Friemel et al. |
| 5,907,364 A | 5/1999 | Furuhata et al. |
| 5,912,994 A | 6/1999 | Norton et al. |
| 5,920,360 A | 7/1999 | Coleman |
| 5,929,859 A | 7/1999 | Meijers |
| 5,940,528 A | 8/1999 | Tanaka et al. |
| 5,959,697 A | 9/1999 | Coleman |
| 5,973,700 A | 10/1999 | Taylor et al. |
| 5,973,831 A | 10/1999 | Kleinberger et al. |
| 5,982,350 A | 11/1999 | Hekmatpour et al. |
| 5,990,903 A | 11/1999 | Donovan |
| 6,005,582 A | 12/1999 | Gabriel et al. |
| 6,011,581 A | 1/2000 | Swift et al. |
| 6,014,473 A | 1/2000 | Hossack et al. |
| 6,023,276 A | 2/2000 | Kawai et al. |
| 6,025,882 A | 2/2000 | Geshwind |
| 6,031,564 A | 2/2000 | Ma et al. |
| 6,049,628 A | 4/2000 | Chen et al. |
| 6,056,691 A | 5/2000 | Urbano et al. |
| 6,067,125 A | 5/2000 | May |
| 6,086,537 A | 7/2000 | Urbano et al. |
| 6,088,006 A | 7/2000 | Tabata |
| 6,091,421 A | 7/2000 | Terrasson |
| 6,102,865 A | 8/2000 | Hossack et al. |
| 6,108,005 A | 8/2000 | Starks et al. |
| 6,118,584 A | 9/2000 | Van Berkel et al. |
| 6,119,123 A | 9/2000 | Elenbaas et al. |
| 6,132,376 A | 10/2000 | Hossack et al. |
| 6,141,433 A | 10/2000 | Moed et al. |
| 6,166,744 A | 12/2000 | Jaszlics et al. |
| 6,173,328 B1 | 1/2001 | Sato |
| 6,184,937 B1 | 2/2001 | Williams et al. |
| 6,198,484 B1 | 3/2001 | Kameyama |
| 6,201,900 B1 | 3/2001 | Hossack et al. |
| 6,208,348 B1 | 3/2001 | Kaye |
| 6,211,941 B1 | 4/2001 | Erland |
| 6,215,516 B1 | 4/2001 | Ma et al. |
| 6,222,948 B1 | 4/2001 | Hossack et al. |

(56) References Cited

U.S. PATENT DOCUMENTS

| | | |
|---|---|---|
| 6,226,015 B1 | 5/2001 | Danneels et al. |
| 6,228,030 B1 | 5/2001 | Urbano et al. |
| 6,263,101 B1 | 7/2001 | Klein |
| 6,271,859 B1 | 8/2001 | Asente |
| 6,314,211 B1 | 11/2001 | Kim et al. |
| 6,337,709 B1 | 1/2002 | Yamaashi et al. |
| 6,360,027 B1 | 3/2002 | Hossack et al. |
| 6,364,835 B1 | 4/2002 | Hossack et al. |
| 6,373,970 B1 | 4/2002 | Dong et al. |
| 6,390,980 B1 | 5/2002 | Peterson et al. |
| 6,416,477 B1 | 7/2002 | Jago |
| 6,445,816 B1 | 9/2002 | Pettigrew |
| 6,456,340 B1 | 9/2002 | Margulis |
| 6,466,205 B2 | 10/2002 | Simpson et al. |
| 6,477,267 B1 | 11/2002 | Richards |
| 6,492,986 B1 | 12/2002 | Metaxas et al. |
| 6,496,598 B1 | 12/2002 | Harman |
| 6,509,926 B1 | 1/2003 | Mills et al. |
| 6,515,659 B1 | 2/2003 | Kaye et al. |
| 6,535,233 B1 | 3/2003 | Smith |
| 6,590,573 B1 | 7/2003 | Geshwind |
| 6,606,166 B1 | 8/2003 | Knoll |
| 6,611,268 B1 | 8/2003 | Szeliski et al. |
| 6,650,339 B1 | 11/2003 | Silva et al. |
| 6,662,357 B1 | 12/2003 | Bowman-Amueh |
| 6,665,798 B1 | 12/2003 | McNally et al. |
| 6,677,944 B1 | 1/2004 | Yamamoto |
| 6,686,591 B2 | 2/2004 | Ito et al. |
| 6,686,926 B1 | 2/2004 | Kaye |
| 6,707,487 B1 | 3/2004 | Aman et al. |
| 6,727,938 B1 | 4/2004 | Randall |
| 6,737,957 B1 | 5/2004 | Petrovic et al. |
| 6,744,461 B1 | 6/2004 | Wada et al. |
| 6,765,568 B2 | 7/2004 | Swift et al. |
| 6,791,542 B2 | 9/2004 | Matusik et al. |
| 6,798,406 B1 | 9/2004 | Jones et al. |
| 6,813,602 B2 | 11/2004 | Thyssen |
| 6,847,737 B1 | 1/2005 | Kouri et al. |
| 6,859,523 B1 | 2/2005 | Jilk et al. |
| 6,964,009 B2 | 11/2005 | Samaniego et al. |
| 6,965,379 B2 | 11/2005 | Lee et al. |
| 6,973,434 B2 | 12/2005 | Miller |
| 7,000,223 B1 | 2/2006 | Knutson et al. |
| 7,006,881 B1 | 2/2006 | Hoffberg et al. |
| 7,027,054 B1 | 4/2006 | Cheiky et al. |
| 7,032,177 B2 | 4/2006 | Novak et al. |
| 7,035,451 B2 | 4/2006 | Harman et al. |
| 7,079,075 B1 | 7/2006 | Connor et al. |
| 7,102,633 B2 | 9/2006 | Kaye et al. |
| 7,116,323 B2 | 10/2006 | Kaye et al. |
| 7,116,324 B2 | 10/2006 | Kaye et al. |
| 7,117,231 B2 | 10/2006 | Fischer et al. |
| 7,136,075 B1 | 11/2006 | Hamburg |
| 7,181,081 B2 | 2/2007 | Sandrew |
| 7,254,265 B2 | 8/2007 | Naske et al. |
| 7,260,274 B2 | 8/2007 | Sawhney et al. |
| 7,272,265 B2 | 9/2007 | Kouri et al. |
| 7,298,094 B2 | 11/2007 | Yui |
| 7,308,139 B2 | 12/2007 | Wentland et al. |
| 7,333,519 B2 | 2/2008 | Sullivan et al. |
| 7,333,670 B2 | 2/2008 | Sandrew |
| 7,343,082 B2 | 3/2008 | Cote et al. |
| 7,461,002 B2 | 12/2008 | Crockett et al. |
| 7,512,262 B2 | 3/2009 | Criminisi et al. |
| 7,519,990 B1 | 4/2009 | Xie |
| 7,532,225 B2 | 5/2009 | Fukushima et al. |
| 7,538,768 B2 | 5/2009 | Kiyokawa et al. |
| 7,542,034 B2 | 6/2009 | Spooner et al. |
| 7,573,475 B2 | 8/2009 | Sullivan et al. |
| 7,573,489 B2 | 8/2009 | Davidson et al. |
| 7,576,332 B2 | 8/2009 | Britten |
| 7,577,312 B2 | 8/2009 | Sandrew |
| 7,610,155 B2 | 10/2009 | Timmis et al. |
| 7,624,337 B2 | 11/2009 | Sull et al. |
| 7,630,533 B2 | 12/2009 | Ruth et al. |
| 7,663,689 B2 | 2/2010 | Marks |
| 7,680,653 B2 | 3/2010 | Yeldener |
| 7,772,532 B2 | 8/2010 | Olsen et al. |
| 7,894,633 B1 | 2/2011 | Harman |
| 8,085,339 B2 | 12/2011 | Marks |
| 8,217,931 B2 | 7/2012 | Lowe et al. |
| 2001/0025267 A1 | 9/2001 | Janiszewski |
| 2001/0051913 A1 | 12/2001 | Vashistha et al. |
| 2002/0048395 A1 | 4/2002 | Harman et al. |
| 2002/0049778 A1 | 4/2002 | Bell |
| 2002/0063780 A1 | 5/2002 | Harman et al. |
| 2002/0075384 A1 | 6/2002 | Harman |
| 2003/0018608 A1 | 1/2003 | Rice |
| 2003/0046656 A1 | 3/2003 | Saxena |
| 2003/0069777 A1 | 4/2003 | Or-Bach |
| 2003/0093790 A1 | 5/2003 | Logan et al. |
| 2003/0097423 A1 | 5/2003 | Ozawa et al. |
| 2003/0154299 A1 | 8/2003 | Hamilton |
| 2003/0177024 A1 | 9/2003 | Tsuchida |
| 2004/0004616 A1 | 1/2004 | Konya et al. |
| 2004/0062439 A1 | 4/2004 | Cahill et al. |
| 2004/0189796 A1 | 9/2004 | Ho et al. |
| 2004/0258089 A1 | 12/2004 | Derechin et al. |
| 2005/0088515 A1 | 4/2005 | Geng |
| 2005/0146521 A1 | 7/2005 | Kaye et al. |
| 2005/0188297 A1 | 8/2005 | Knight et al. |
| 2005/0207623 A1 | 9/2005 | Liu et al. |
| 2005/0231501 A1 | 10/2005 | Nitawaki |
| 2006/0061583 A1 | 3/2006 | Spooner et al. |
| 2006/0159345 A1* | 7/2006 | Clary et al. .................. 382/186 |
| 2006/0274905 A1 | 12/2006 | Lindahl et al. |
| 2007/0052807 A1 | 3/2007 | Zhou et al. |
| 2007/0260634 A1 | 11/2007 | Makela et al. |
| 2007/0286486 A1* | 12/2007 | Goldstein .................... 382/187 |
| 2007/0296721 A1 | 12/2007 | Chang et al. |
| 2008/0044155 A1 | 2/2008 | Kuspa |
| 2008/0079851 A1 | 4/2008 | Stanger et al. |
| 2008/0147917 A1 | 6/2008 | Lees et al. |
| 2008/0162577 A1 | 7/2008 | Fukuda et al. |
| 2008/0181486 A1 | 7/2008 | Spooner et al. |
| 2008/0225040 A1 | 9/2008 | Simmons et al. |
| 2008/0225042 A1 | 9/2008 | Birtwistle et al. |
| 2008/0225045 A1 | 9/2008 | Birtwistle et al. |
| 2008/0225059 A1 | 9/2008 | Lowe et al. |
| 2008/0226123 A1 | 9/2008 | Birtwistle et al. |
| 2008/0226128 A1 | 9/2008 | Birtwistle et al. |
| 2008/0226160 A1 | 9/2008 | Birtwistle et al. |
| 2008/0226181 A1 | 9/2008 | Birtwistle et al. |
| 2008/0226194 A1 | 9/2008 | Birtwistle et al. |
| 2008/0227075 A1 | 9/2008 | Poor et al. |
| 2008/0228449 A1 | 9/2008 | Birtwistle et al. |
| 2008/0246759 A1 | 10/2008 | Summers |
| 2008/0246836 A1 | 10/2008 | Lowe et al. |
| 2008/0259073 A1 | 10/2008 | Lowe et al. |
| 2009/0002368 A1 | 1/2009 | Vitikainen et al. |
| 2009/0033741 A1 | 2/2009 | Oh et al. |
| 2009/0116732 A1 | 5/2009 | Zhou et al. |
| 2009/0219383 A1 | 9/2009 | Passomore |
| 2009/0256903 A1 | 10/2009 | Spooner et al. |
| 2011/0050864 A1 | 3/2011 | Bond |
| 2011/0074784 A1 | 3/2011 | Turner |
| 2011/0169827 A1 | 7/2011 | Spooner et al. |
| 2011/0169914 A1 | 7/2011 | Lowe et al. |
| 2011/0188773 A1 | 8/2011 | Wei et al. |
| 2011/0227917 A1 | 9/2011 | Lowe et al. |
| 2011/0273531 A1 | 11/2011 | Ito et al. |
| 2012/0032948 A1 | 2/2012 | Lowe et al. |
| 2012/0087570 A1 | 4/2012 | Seo et al. |
| 2012/0102435 A1 | 4/2012 | Han et al. |
| 2012/0188334 A1 | 7/2012 | Fortin et al. |
| 2012/0281906 A1 | 8/2012 | Appia |
| 2012/0274626 A1 | 11/2012 | Hsieh |
| 2013/0051659 A1 | 2/2013 | Yamamoto |

FOREIGN PATENT DOCUMENTS

| | | |
|---|---|---|
| EP | 1187494 | 3/2002 |
| JP | 60-52190 | 3/1985 |
| JP | 2003046982 | 2/2003 |

(56) References Cited

FOREIGN PATENT DOCUMENTS

| JP | 2004-207985 | 7/2004 |
|---|---|---|
| KR | 20120095059 | 2/2012 |
| KR | 20130061289 | 11/2013 |
| SU | 1192168 A | 11/1982 |
| WO | 97/24000 | 7/1997 |
| WO | 99/12127 | 3/1999 |
| WO | 99/30280 | 6/1999 |
| WO | 00/79781 | 12/2000 |
| WO | 01/01348 | 1/2001 |
| WO | 02/13143 | 2/2002 |
| WO | 2006/078237 | 7/2006 |
| WO | 2008/075276 | 6/2008 |
| WO | 2011/029209 | 3/2011 |
| WO | 2012016600 | 9/2012 |
| WO | 2013084234 | 6/2013 |

OTHER PUBLICATIONS

"Nintendo DSi Uses Camera Face Tracking to Create 3D Mirages", retrieved from www.Gizmodo.com on Mar. 18, 2013, 3 pages.
IPER, Mar. 29, 2007, PCT/US2005/014348, 5 pages.
IPER, Oct. 5, 2013, PCT/US2011/058182, 6 pages.
International Search Report, Jun. 13, 2003, PCT/US02/14192, 4 pages.
Partial Testimony, Expert: Samuel Zhou, Ph.D., 2005 WL 3940225 (C.D.Cal.), Jul. 21, 2005, 21 pages.
PCT ISR, Feb. 27, 2007, PCT/US2005/014348, 8 pages.
PCT ISR, Sep. 11, 2007, PCT/US07/62515, 9 pages.
CA Office Action, Dec. 28, 2011, Appl No. 2,446,150, 4 pages.
PCT ISR, Nov. 14, 2007, PCT/US07/62515, 24 pages.
PCT IPRP, Jul. 4, 2013, PCT/US2011/067024, 5 pages.
European Office Action dated Jun. 26, 2013, received for EP Appl. No. 02734203.9 on Jul. 22, 2013, 5 pages.
International Search Report and Written Opinion issued for PCT/US2013/072447, dated Mar. 13, 2014, 6 pages.
Ohm et al., An Object-Based System for Stereopscopic Viewpoint Synthesis, IEEE transaction on Circuits and Systems for Video Technology, vol. 7, No. 5, Oct. 1997, pp. 801-811.
Izquierdo et al., Virtual 3D-View Generation from Stereoscopic Video Data, IEEE, Jan. 1998, pp. 1219-1224.
Kaufman, D., "The Big Picture", Apr. 1998, http://www.xenotech.com Apr. 1998, pp. 1-4.
Hanrahan et al., "Direct WYSIWYG painting and texturing on 3D shapes", Computer Graphics, vol. 24, Issue 4, pp. 215-223. Aug. 1990.
Grossman, "Look Ma, No Glasses", Games, Apr. 1992, pp. 12-14.
Slinker et al., "The Generation and Animation of Random Dot and Random Line Autostereograms", Journal of Imaging Science and Technology, vol. 36, No. 3, pp. 260-267, May 1992.
A. Michael Noll, Stereographic Projections by Digital Computer, Computers and Automation, vol. 14, No. 5 (May 1965), pp. 32-34.
A. Michael Noll, Computer-Generated Three-Dimensional Movies, Computers and Automation, vol. 14, No. 11 (Nov. 1965), pp. 20-23.
Selsis et al., Automatic Tracking and 3D Localization of Moving Objects by Active Contour Models, Intelligent Vehicles 95 Symposium, Sep. 1995, pp. 96-100.
Smeulders et al., Tracking Nonparameterized Object Contours in Video, IEEE Transactions on Image Processing, vol. 11, No. 9, Sep. 2002, pp. 1081-1091.
Tam et al., "3D-TV Content Generation: 2D-To-3D Conversion", ICME 2006, p. 1868-1872.
Harman et al. "Rapid 2D to 3D Conversion", The Reporter, vol. 17, No. 1, Feb. 2002, 12 pages.
Legend Films, "System and Method for Conversion of Sequences of Two-Dimensional Medical Images to Three-Dimensional Images" Sep. 12, 2013, 7 pages.
Office Action for EPO Patent Application No. 02 734 203.9 dated Sep. 12, 2006. (4 pages).
Office Action for AUS Patent Application No. 2002305387 dated Mar. 9, 2007. (2 pages).
Office Action for EPO Patent Application No. 02 734 203.9 dated Oct. 7, 2010. (5 pages).
First Examination Report for Indian Patent Application No. 01779/DELNP/2003 dated Mar. 2004. (4 pages).
International Search Report Dated Jun. 13, 2003. (3 pages).
Declaration of Barbara Frederiksen in Support of In-Three, Inc's Opposition to Plaintiff's Motion for Preliminary Injunction, Aug. 1, 2005, *IMAX Corporation et al v. In-Three, Inc.*, Case No. CV05 1795 FMC (Mcx). (25 pages).
USPTO, Board of Patent Appeals and Interferences, Decision on Appeal dated Jul. 30, 2010, Ex parte Three-Dimensional Media Group, Ltd., Appeal 2009-004087, Reexamination Control No. 90/007,578, US Patent 4,925,294. (88 pages).
Office Action for Canadian Patent Application No. 2,446,150 dated Oct. 8, 2010. (6 pages).
Office Action for Canadian Patent Application No. 2,446,150 dated Jun. 13, 2011. (4 pages).
International Search Report received fro PCT Application No. PCT/US2011/067024, dated Aug. 22, 2012, 10 pages.
Lenny Lipton, "Foundations of the Stereo-Scopic Cinema, a Study in Depth" With and Appendix on 3D Television, 325 pages, May 1978.
Interpolation (from Wikipedia encyclopedia, article pp. 1-6), retrieved from Internet URL:http://en.wikipedia.org/wiki/Interpolation on Jun. 5, 2008.
Optical Reader (from Wikipedia encyclopedia, article p. 1), retrieved from Internet URL:http://en.wikipedia.org/wiki/Optical_reader on Jun. 5, 2008.
Declaration of Steven K. Feiner, Exhibit A, 10 pages, Nov. 2, 2007.
Declaration of Michael F. Chou, Exhibit B, 12 pages, Nov. 2, 2007.
Declaration of John Marchioro, Exhibit C, 3 pages, Nov. 2, 2007.
Exhibit 1 to Declaration of John Marchioro, Revised translation of portions of Japanese Patent Document No. 60-52190 to Hiromae, 3 pages, Nov. 2, 2007.
U.S. Patent and Trademark Office, Before the Board of Patent Appeals and Interferences, Ex Parte Three-Dimensional Media Group, Ltd., Appeal 2009-004087, Reexamination Control No. 90/007,578, US Patent No. 4,925,294, Decision on Appeal, 88 pages, Jul. 30, 2010.
International Search Report dated May 10, 2012, 8 pages.
Machine translation of JP Patent No. 2004-207985, dated Jul. 22, 2008, 34 pages.
Daniel L. Symmes, Three-Dimensional Image, Microsoft Encarta Online Encyclopedia (hard copy printed May 28, 2008 and of record, now indicated by the website indicated on the document to be discontinued: http://encarta.msn.com/text_761584746_0/Three-Dimensional_Image.htm).
U.S. District Court, C.D. California, *Imax v. In-Three*, No. 05 CV 1795, 2005, Partial Testimony, Expert: David Geshwind, WestLaw 2005, WL 3940224 (C.D.Cal.), 8 pages.
U.S. District Court, C.D. California, *Imax Corporation and Three-Dimensional Media Group, Ltd.*, v. *In-Three, Inc.*, Partial Testimony, Expert: Samuel Zhou, Ph.D., No. CV 05-1795 FMC(Mcx), Jul. 19, 2005, 2005 WL 3940223 (C.D.Cal.), 6 pages.
U.S. District Court, C.D. California, *Imax v. In-Three*. No. 06 CV 1795. Jul. 21, 2005, Partial Testimony, Expert: Samuel Zhou, Ph.D., 2005 WL 3940225 (C.D.Cal.), 21 pages.
U.S. District Court, C.D. California, Western Division, *Imax Corporation, and Three-Dimensional Media Group, Ltd.* v. *In-Three, Inc.*, No. CV05 1795 FMC (Mcx). Jul. 18, 2005. Declaration of Barbara Frederiksen in Support of In-Three, Inc.'s Opposition to Plaintiffs' Motion for Preliminary Injunction, 2005 WL 5434580 (C.D.Cal.), 13 pages.
Noll et al., "Stereographic Projections by Digital Computer", Computers and Automation for May 1965, pp. 32-34.
Noll, "Computer-Generated Three-Dimensional Movies" Computers and Automation for Nov. 1965, pp. 20-23.
Murray et al., Active Tracking, IEEE International Conference on Intelligent Robots and Systems, Sep. 1993, pp. 1021-1028.
Gao et al., Perceptual Motion Tracking from Image Sequences, IEEE, Jan. 2001, pp. 389-392.

(56) References Cited

OTHER PUBLICATIONS

Yasushi Mae, et al., "Object Tracking in Cluttered Background Based on Optical Flow and Edges," Proc. 13th Int. Conf. on Pattern Recognition, vol. 1, pp. 196-200, Apr. 1996.

Di Zhong, Shih-Fu Chang, "AMOS: An Active System for MPEG-4 Video Object Segmentation," ICIP (2) 8: 647-651, Apr. 1998.

Hua Zhong, et al., "Interactive Tracker—A Semi-automatic Video Object Tracking and Segmentation System," Microsoft Research China, http://research.microsoft.com (Aug. 26, 2003).

Eric N. Mortensen, William A. Barrett, "Interactive segmentation with Intelligent Scissors," Graphical Models and Image Processing, v.60 n.5, p. 349-384, Sep. 2002.

Michael Gleicher, "Image Snapping," SIGGRAPH: 183-190, Jun. 1995.

Joseph Weber, et al., "Rigid Body Segmentation and Shape Description . . . ," IEEE Transactions on Pattern Analysis and Machine Intelligence, vol. 19, No. 2, Feb. 1997,pp. 139-143.

E. N. Mortensen and W. A. Barrett, "Intelligent Scissors for Image Composition," Computer Graphics (SIGGRAPPH '95), pp. 191-198, Los Angeles, CA, Aug. 1995.

* cited by examiner

LINE DEPTH AUGMENTATION SYSTEM AND METHOD FOR CONVERSION OF 2D IMAGES TO 3D IMAGES

BACKGROUND OF THE INVENTION

1. Field of the Invention

One or more embodiments of the invention are related to the field of image analysis and image enhancement and computer graphics processing of two-dimensional images into three-dimensional images. More particularly, but not by way of limitation, one or more embodiments of the invention enable a line depth augmentation system and method for conversion of 2D images to 3D images. Embodiments enable adding or augmenting lines with depth, for example in cell animation images or other images having limited color range on a region by region basis in which the lines appear, for example without modeling the lines as part of a wireframe or other depth model. This enables rapid conversion of two-dimensional images to three-dimensional images by enabling stereographers to quickly add depth to lines in images without modeling or precisely matching the depth of the line to the region in which the line appears. Embodiments may output a stereoscopic image, e.g., a three-dimensional viewing enabled image, such as an anaglyph image or pair of images for left and right eye viewing of different horizontally offset viewpoints for left and right eyes, for example with lines having the desired depth.

2. Description of the Related Art

Three-dimensional images include any type of image or images that provide different left and right eye views to encode depth, some types of three-dimensional images require use of special glasses to ensure the left eye viewpoint is shown to the left eye and the right eye viewpoint is shown to the right eye of an observer. Existing systems that are utilized to convert two-dimensional images to three-dimensional images typically require rotoscoping of images to create outlines of regions in the images. The rotoscoped regions are then individually depth adjusted by hand to produce a left and right eye image, or single anaglyph image, or other three-dimensionally viewable image, such as a polarized three-dimensional image viewed with left and right lenses having different polarization angles for example.

Current methods of adding depth to regions including lines require stereographers to add depth to the region in which line occurs. This is the case since all regions in an image that are to be depth modified are modeled in known systems regardless of whether or not they contain limited colors that do not have visual indications of depth. In other words, areas where the lines exist must generally be modeled to be part of a three-dimensional shape, e.g., a sphere or other volume. Thus, time is required to model areas in cell animation that does not necessarily need to be precisely modeled since the areas surrounding the lines may be of a single color, or of limited range for example.

In addition, typical methods for converting movies from 2D to 3D that may include hundreds of thousands of frames require tremendous amount of labor for modeling, and generally utilize an iterative workflow for correcting errors. The iterative workflow includes rotoscoping or modeling objects in each frame, adding depth and then rendering the frame into left and right viewpoints forming an anaglyph image or a left and right image pair. If there are errors in the edges of the masked objects for example, then the typical workflow involves an "iteration", i.e., sending the frames back to the workgroup responsible for masking the objects, (which can be in a country with cheap unskilled labor half way around the world), after which the masks are sent to the workgroup responsible for rendering the images, (again potentially in another country), wherein rendering is accomplished by either shifting input pixels left and right for cell animation images for example or ray tracing the path of light through each pixel in left and right images to simulate the light effects the path of light interacts with and for example bounces off of or through, which is computationally extremely expensive. After rendering, the rendered image pair is sent back to the quality assurance group. It is not uncommon in this workflow environment for many iterations of a complicated frame to take place. This is known as "throw it over the fence" workflow since different workgroups work independently to minimize their current workload and not as a team with overall efficiency in mind. With hundreds of thousands of frames in a movie, the amount of time that it takes to iterate back through frames containing artifacts can become high, causing delays in the overall project. Even if the re-rendering process takes place locally, the amount of time to re-render or ray-trace all of the images of a scene can cause significant processing and hence delays on the order of at least hours. Each iteration may take a long period of time to complete as the work may be performed by groups in disparate locations having shifted work hours. Eliminating much of the modeling of objects that do not need to be modeled due to their lack of visual indications of depth as is the case in cell animation generally would provide a huge savings in wall-time, or end-to-end time that a conversion project takes, thereby increasing profits and minimizing the workforce needed to implement the workflow.

Hence there is a need for a line depth augmentation system and method for conversion of 2D images to 3D.

BRIEF SUMMARY OF THE INVENTION

Embodiments of the invention accept input for example from a person responsible for masking, to mask lines that may be depth augmented using an embodiment of the system for example. In one or more embodiments, the mask associated with a line may be automatically or semi-automatically created by the system. The system for example may accept an input for the mask and search for high contrast areas and build masks iteratively, pixel-by-pixel through a fill algorithm or operation. In one or more embodiments, the mask may be made slightly larger than the line since the color surrounding the line is generally monochrome. Hence, when depth is added to the line there are no artifacts on the edges since the left and right offsets of area surrounding the line place image data that is of the same color in a horizontal offset over the same color. If the person who is responsible for masking creates masks first, the masked lines then may be viewed by a stereographer who then indicates the depths at which to place lines that exist in a two-dimensional image to convert the image to a three-dimensional image. Alternatively or in combination, the person responsible for masking and the stereographer may work in either order or together on a particular image in parallel or serially as desired. In one or more embodiments of the invention, the input for depth of a line is accepted by the system and displayed at the depth indicated on the three-dimensional version of the two-dimensional input image. In one or more embodiments, the depth may be specified using a graphical input device, such as a graphics drawing tablet. In other embodiments or in combination, depths may be input via a keyboard, or via voice commands while drawing annotation information or symbols for example. After the depth is associated with the respective line, the line is offset by the proper horizontal left and right amount to make a stereoscopic image or pair of images that enable three-dimensional viewing. The line may be adjusted in depth without altering the shape or depth of the region in which the line occurs since there are generally no visual indications of depth in a cell animation region having a single color or small variation of color for example.

Embodiments of the invention make this process extremely intuitive as the depth to apply to lines is input easily and avoids modeling and the associated labor required to model objects that have lines. Since animated images generally have no visual color variations on monochrome characters or homogenous color portions of objects or regions, the lines may be depth adjusted without applying varying depth of objects to match the depth applied to the lines in those objects, which saves a great deal of time in specify, an adjusting depth of lines, for example without complex modeling or re-rendering.

When rendering an image pair, left and right viewpoint images and left and right absolute translation files, or a single relative translation file may be generated and/or utilized by one or more embodiments of the invention. The translation files specify the pixel offsets for each source pixel in the original 2D image, for example in relative or absolute form respectively. These files are generally related to an alpha mask for each layer, for example a layer for an actress, a layer for a door, a layer for a background, etc. These translation files, or maps are passed from the depth augmentation group that renders 3D images, to the quality assurance workgroup. This allows the quality assurance workgroup (or other workgroup such as the depth augmentation group) to perform real-time editing of 3D images without re-rendering for example to alter layers/colors/masks and/or remove artifacts such as masking errors without delays associated with processing time/re-rendering and/or iterative workflow that requires such re-rendering or sending the masks back to the mask group for rework, wherein the mask group may be in a third world country with unskilled labor on the other side of the globe. In addition, when rendering the left and right images, i.e., 3D images, the Z depth of regions within the image, such as actors for example, may also be passed along with the alpha mask to the quality assurance group, who may then adjust depth as well without re-rendering with the original rendering software. This may be performed for example with generated missing background data from any layer so as to allow "downstream" real-time editing without re-rendering or ray-tracing for example.

Quality assurance may give feedback to the masking group or depth augmentation group for individuals so that these individuals may be instructed to produce work product as desired for the given project, without waiting for, or requiring the upstream groups to rework anything for the current project. This allows for feedback yet eliminates iterative delays involved with sending work product back for rework and the associated delay for waiting for the reworked work product. Elimination of iterations such as this provide a huge savings in wall-time, or end-to-end time that a conversion project takes, thereby increasing profits and minimizing the workforce needed to implement the workflow.

In summary, embodiments of the invention minimize the time to augment lines with depth, for example for cell animation by accepting or automatically generating masks for lines to avoid modeling objects, or minimize modeling of objects in which the lines appear. Embodiments of the system also save time by eliminating re-rendering by other work groups, and allow depth to be correctly input local to a work group.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1:
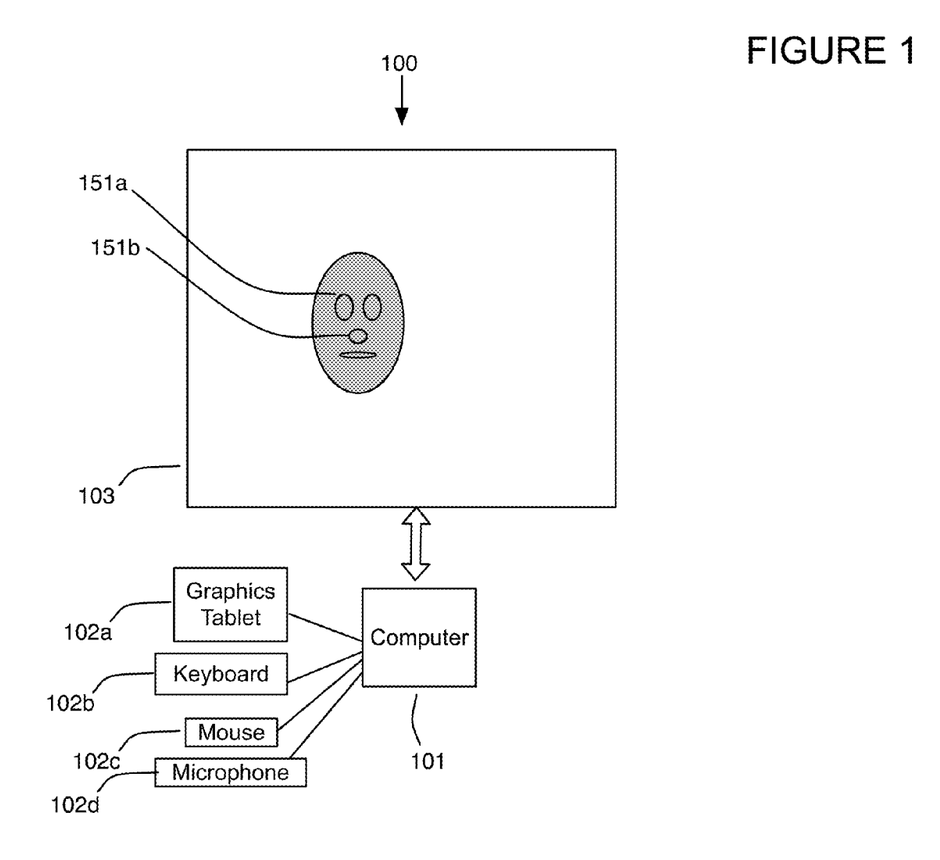
FIG. 1 shows an architectural view of an embodiment of the system.

FIG. 1 shows an architectural view of an embodiment of the system 100. As illustrated, computer 101 is coupled with any combination of input devices including graphics tablet 102a, keyboard 102b, mouse 102c and/or microphone 102d. Computer 101 may obtain a two-dimensional image and display the image on screen 103. The image may be obtained from any local or remote memory device associated with or accessible by the computer for example. Screen 103 may display a single image that may be viewed at depth, for example as an anaglyph using two different colors shifted left and right that may be viewed with glasses with lenses of two different colors, e.g., Red and Blue to view the image as a three-dimensional image for example. In general, the two-dimensional image may have multiple lines within regions that are to be converted to different depths, for example first line 151a, e.g., an eye or eyebrow and second line 151b, a nose for ease of illustration. Any lines representing any object may be depth augmented using embodiments of the invention.

Embodiments of the system accept a mask having an area associated with a line, for example in a monochrome region or region that varies little in color, in the two-dimensional source image, for example line 151a or line 151b in the cartoon character shown as a face, that may be of a monochrome color, or limited color range for example that does not provide any visual indication of depth or depth variation. The methods for building the mask are detailed further below. Embodiments of the system also accept a depth associated with the line or lines within the region, for example monochrome region, in the two-dimensional source image via an input device coupled with the computer. Embodiments apply the depth to the area of the two-dimensional image defined by the mask to create a three-dimensional image, for example without altering a depth of a remainder of the monochrome region where said mask does not occur. Other embodiments enable accepting a second depth for at least a portion of the mask and changing the depth of the output image without any modeling of the region in which the line occurs and without re-rendering or re-ray-tracing.

Embodiment accept the mask or accept the depth or both by accepting an input from the graphics tablet, or the mouse, or the keyboard, or the microphone or any combination thereof. In one or more embodiments the system accepts an input location within the two-dimensional source image via one of the input devices and obtains the color of the pixel at the input location. The area associated with the mask is increased to include all of the contiguous pixels that are within a predetermined range of the color of the pixel, for example analogous to a paint fill operation. The predetermined range of the color may be set to a predetermined percentage of a volume of a color space, or predetermined threshold of luminance associated with the color, or set to zero to exactly match the selected pixel's color as a seed for the mask for example. Embodiments optionally may increase the size of the mask by a predetermined size, for example a predetermined number of pixels or percentage of thickness of the line or any other method. This provides for a more robust or tolerant depth setting operation that results in less artifacts since the region surrounding the line is primarily or totally of one color. In other words, shifting the line and a small portion of a single color around the line, left and right to create a left and right viewing angle causes the line and the single color near the line to be shifted over the same color when altering the depth of the line. Thus, the area surrounding the line does not have to be remodeled or re-rendered to change the depth of the line and since there are no visual indications of depth in the surrounding area the lines potentially float above the area, however the human eye cannot detect this since the area surrounding the line is of one color. Hence, a great deal of modeling is bypassed with depth of an area interpreted by the human mind as having the depth of the line at the differing depth on the single color area.

One or more embodiments of the system accepts the depth through analysis of motion data obtained from the graphics tablet or mouse, i.e., if the mouse or graphics tablet is sending data indicative of motion away from the user, then the depth may increase, or by moving the mouse or pen on the graphics tablet closer to the user, the depth may decrease. Alternatively or in combination, the acceptance of depth may be performed by parsing alphanumeric data from the keyboard to determine the depth. This enables a user to type in a positive or negative number and set the area to augment depth associated with the mask through numeric input for example. In one or more embodiments another annotation file may be associated with the two-dimensional source image and that image may be analyzed for script or text via optical character recognition software to obtain depth values. Alternatively or in combination, voice recognition software may be utilized to input values for depth that are accepted by the system, for example with a particular mask selected via the mouse or graphics tablet, etc. Positive or negative numbers may be utilized to indicate further or nearer depth depending on the particular studio or organization that is adding depth and embodiments of the invention may utilize any scale or range or units of measure to indicate depth.

Any method of creating the resulting three-dimensional image may be utilized include generating a pair of images that includes one image for viewing with a left and right eye respectively. Alternatively, the system may generate a single anaglyph image for each input two-dimensional image for viewing with glasses having lenses of two different colors. In addition, any other type of single image that encodes left and right eye information such as polarized images is in keeping with the spirit of the invention. Regardless of the type of output image technology utilized to view the image, the area of the mask is displaced relative to the original location in the two-dimensional source image left and right based on the depth to create the three-dimensional image.

Figure 2:
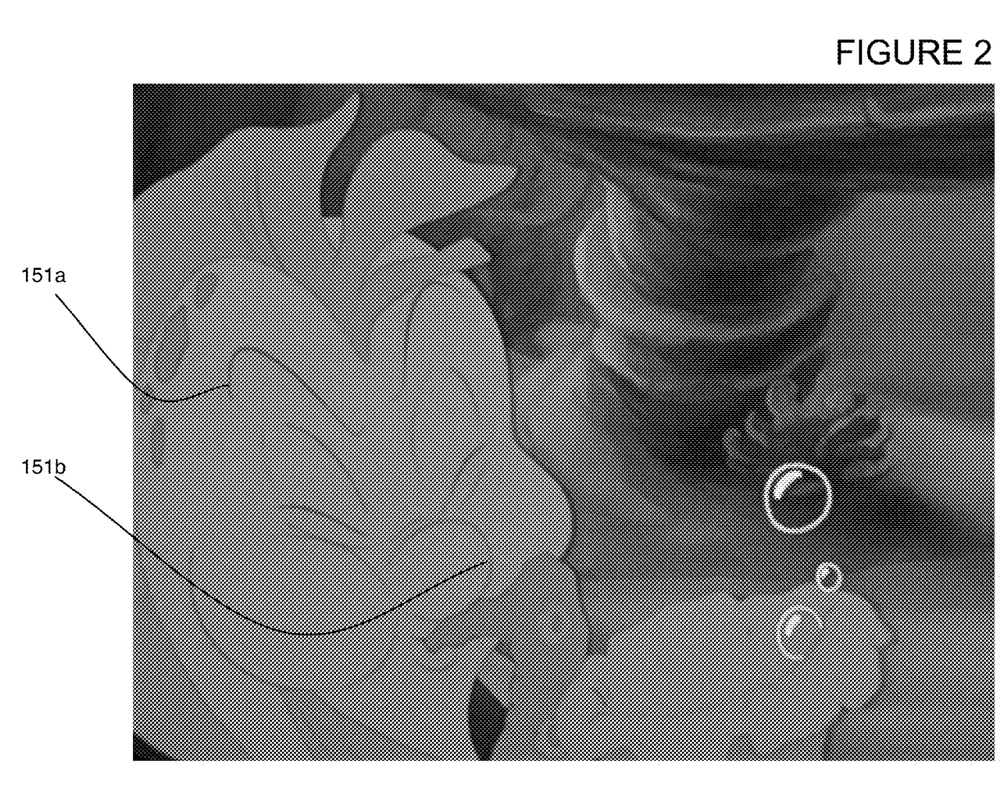
FIG. 2 shows an input two-dimensional image having lines at which depth is to be applied without requiring precise modeling of the object in which the lines appear.
Figure 3:
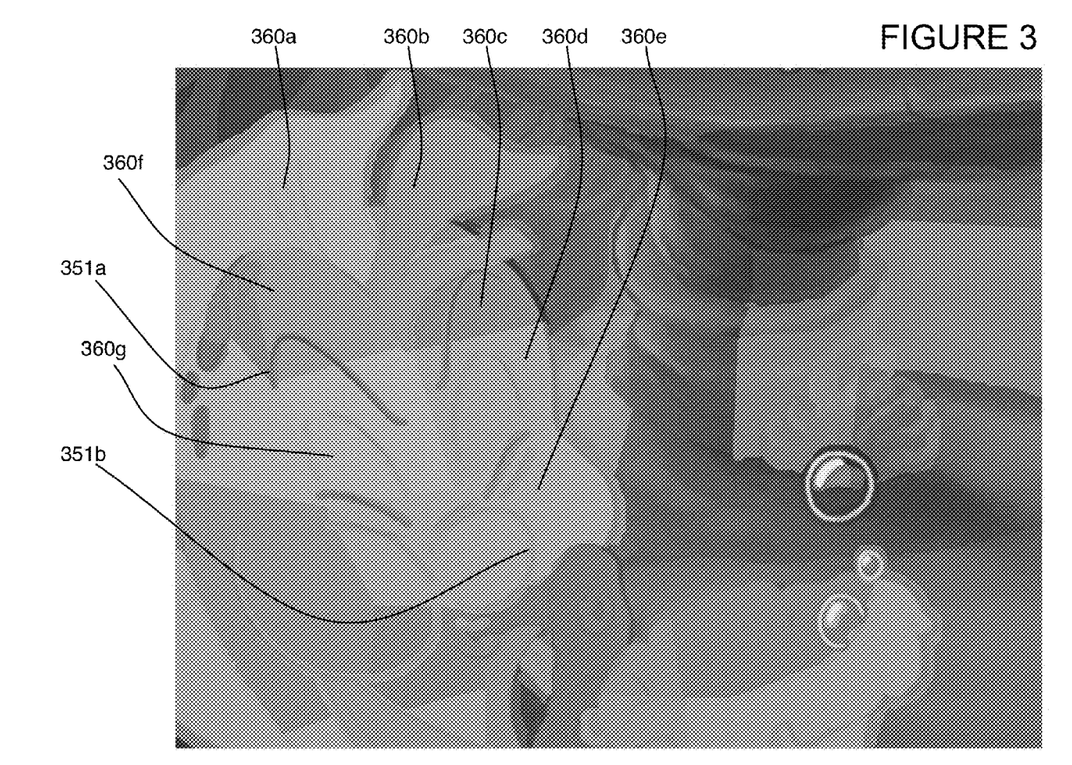
FIG. 3 shows a masked version of the two-dimensional image showing masked lines in an object to apply depth to and various regions of the object in which depth can be applied if desired.

FIG. 2 shows an input two-dimensional image. As shown, a character having a monochrome region, e.g., the face of the character, having lines, here an eyebrow and nose for example. FIG. 3 shows a masked version of the two-dimensional image showing regions within each object to optionally apply depth or shapes to. This enables a basic application of depth to an area without highly complex modeling to match the depth shape of the lines in the image. The underlying source color associated with the particular regions $360a$ and $360b$ are of one color or of a limited color range (see FIG. 2) although the region masks $360a$-$b$ are shown in different colors to indicate potentially different depths or depth shapes may be applied. The underlying source color for regions $360c$-$e$ are also one color, (see FIG. 2). Since regions $360c$-$e$ are masks for underlying areas of one color, or at least close to it, and the lines to be depth adjusted occur thereon, left and right translations of the lines thereon may be performed by masking the lines and generously translating around the lines with slightly enlarged masks to ensure no artifacts occur. For example, in one or more embodiments, mask $351a$ for the underlying line associated with the eyebrow and mask $351b$ for the underlying line associated with the nose for example are optionally of a predetermined thickness greater than the underlying line. Moving the lines with a portion of the surrounding color obtained by the slightly larger mask $351a$-$b$ to the left and right to provide two viewpoints for stereoscopic viewing occurs without complex matching of the line shape to the underlying shape of the region and without artifacts since the color surrounding the shifted foreground line is displaced onto on the same color when generating a left or right eye translated viewpoint. This allows for a different depth or contour that varies in depth to be applied to the lines to indicate depth to the object for the human mind to fill in, that otherwise has no visual indication of depth by altering the depth of the line. In other words, the mask region $360d$ for example may have a basic depth contour applied, but has not color or shading variations and hence the lines on that area may float over them to persuade the human mind that the underlying region actually has depth. Again, minimal application of depth to the background with depth applied to the lines on that limited color range region provides a visual indication of depth to the human mind, without requiring complex modeling of the regions that contain the lines.

In one or more embodiments, the lines may be animated over time, for example enlarged, morphed or otherwise reshaped or moved or with a varying color for example to enhance the expression of the line. This saves a tremendous amount of time since the background region or regions that have common boundaries are not required to be remodeled or rendered again to simply changed the apparent human recognizable depth of the region, since the depth of the region can be implied to the human mind by changing the depth profile of the line in the region. Hence, the lines may float over the underlying region wherein the human mind does not interpret the region and line as having distinct depths. In addition, only the lines that need to be depth altered to indicate depth for a region are masked and/or depth modified.

The other great benefit of one or more embodiments is that for traditional cell animation, lines slightly move from one frame to the next when a human has drawn the lines. In this scenario, using a slightly larger mask than the line enables less tweening or mask reshaping or mask moving to following the exact shape of the line. Hence, a slightly larger mask enables far less work in tracking the mask through a scene.

In one or more embodiments, lines may be automatically selected by the system based on contrast, luminance, color or any other visual component or characteristic, such as thickness of a color area. For example, in one or more embodiment, line isolation processing may include a dilation of color and/ or blur of the image, followed by a subtraction of the image from the original image to detect lines, which works well in cell animation where objects may be of a homogenous color for example. One or more embodiments may highlight all detected lines, lines over a certain length or thickness or curvature or any other feature associated with the lines. Embodiments may show the suggested lines for depth application highlighting a suggested mask or inverting a color or in any other manner. In one or more embodiments, the lines selected may have boundaries over a certain distance to a different background color so that lines further away from the edge of a character are suggested for depth enhancement for example. Embodiments of the invention accept an input to the suggested mask or accept inputs for drawing masks as well.

Figure 4:
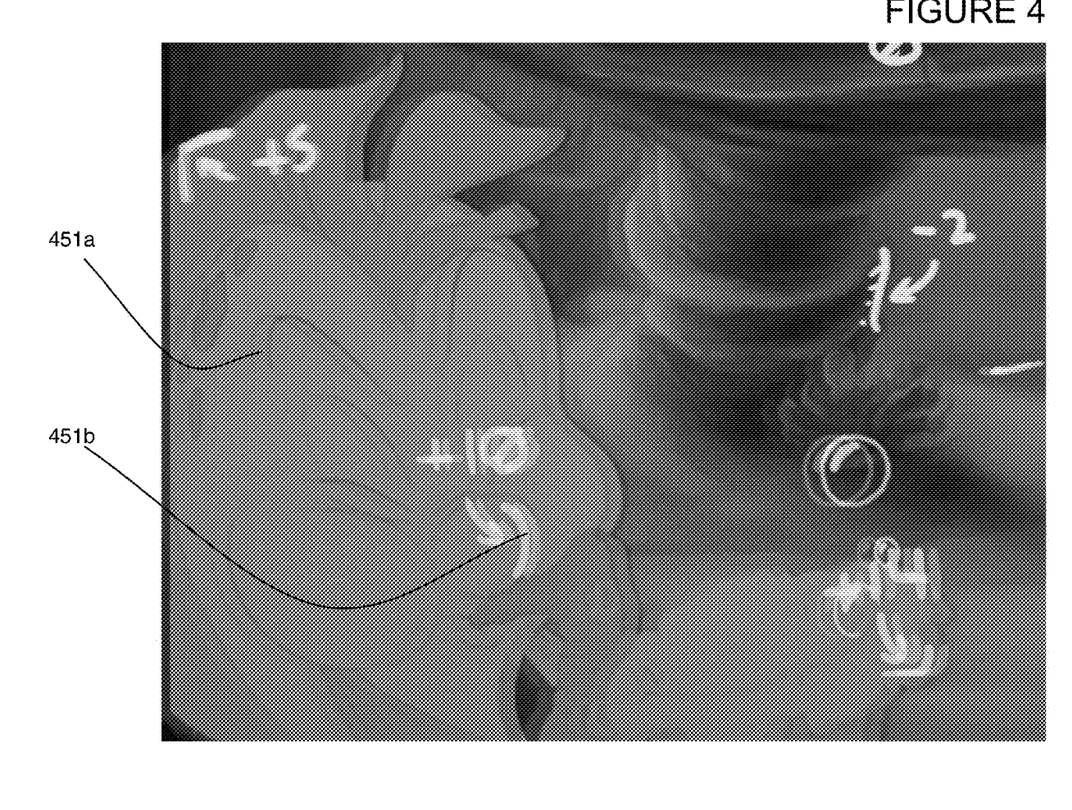
FIG. 4 shows annotations for desired depth of one of the lines shown in FIG. 3, wherein the annotations may be viewed in three-dimensional depth with anaglyph glasses.

FIG. 4 shows optional annotations for desired depth at a specific depth for general messages or at the depth of the desired region for example, wherein the annotations may be viewed in three-dimensional depth with anaglyph glasses. As shown, the two-dimensional image is still in two-dimensions, i.e., the depth across the entire image does not vary. In other words, the two-dimensional image along with the three-dimensional annotations specify the depths to apply to particular areas or regions and is used as an input to the depth augmentation group for example. The depth group then moves the associated regions in depth to match the annotations in an intuitive manner that is extremely fast and provides a built-in sanity check for depth. Using this method, it is inherently verifiable whether a depth of a region is at or about at the depth of the associated annotation. As shown, line 451a that represents an eyebrow on a monochrome region is shown without an associated annotation, while line 451b that represents a nose is shown with an annotation that suggests a 10 pixel forward depth shift. In one or more embodiments, line 451a may float over the region in which the line appears, however, the human mind interprets the area where the line occurs as having the depth contour associated with the line even if the region does not have this contour or depth shape. This is because the limited color range of the region in which the line appears otherwise gives no visual indication as to the depth of the region. Hence, the human mind fills in the depth of the region according to the depth of the line.

Figure 5:
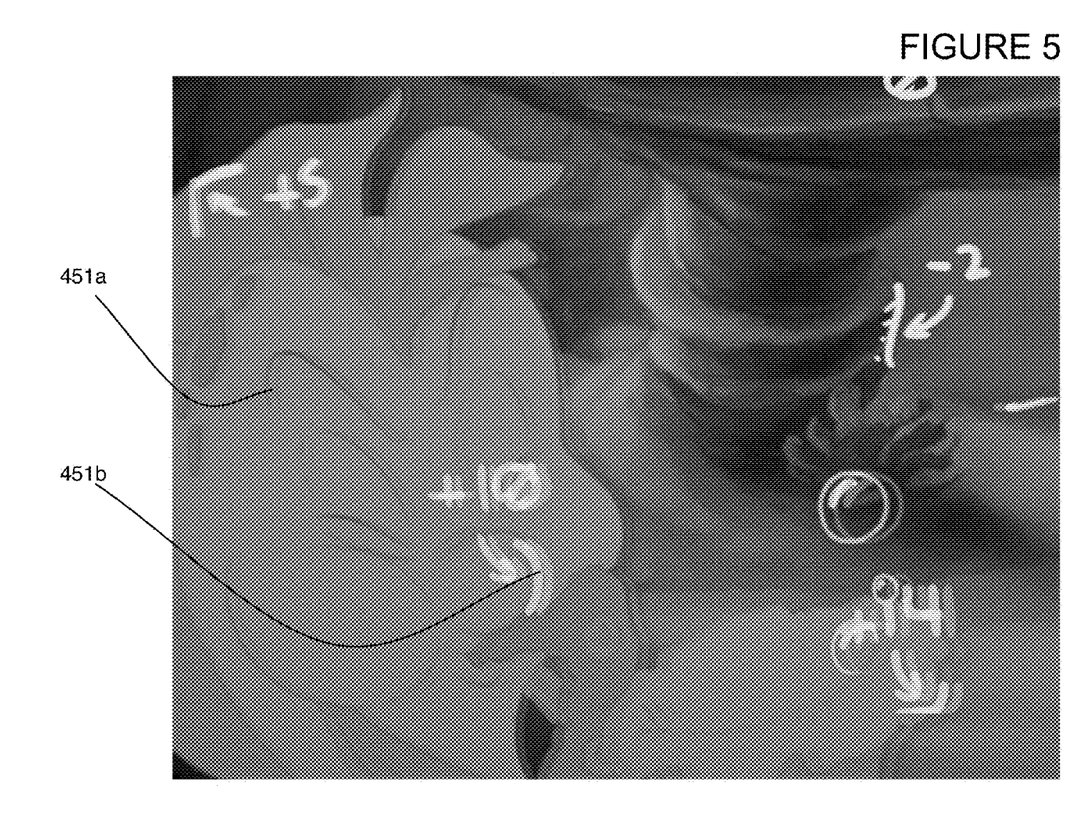
FIG. 5 shows the input image converted to three-dimensional image in anaglyph format, which may be viewed in three-dimensional depth with anaglyph glasses.

FIG. 5 shows the input image converted to three-dimensional image in anaglyph format, which may be viewed in three-dimensional depth with anaglyph glasses. As shown, the individual lines 151a and 151b as shown in FIG. 2, having corresponding areas of masks 351a and 351b respectively as shown in FIG. 3 are shifted in depth to produce an output three-dimensional image. The lines are not generally at the depth of the region in which they appear but are rather the elements in the figure that give the appearance of depth to the region in which the lines appear. This enables simple modeling of depth for the regions in which the lines appear as opposed to the creation of a 3D wire model, or other sophisticated volumetric module to be applied to each region. As the cell animation moves around from frame to frame, for example based on individual artistic hand drawn lines, the generous masking applied to the lines minimize the tracking of the lines between frame to frame while still providing the appearance of depth applied to the line and thus implied to the human mind for the whole region.

Figure 6:
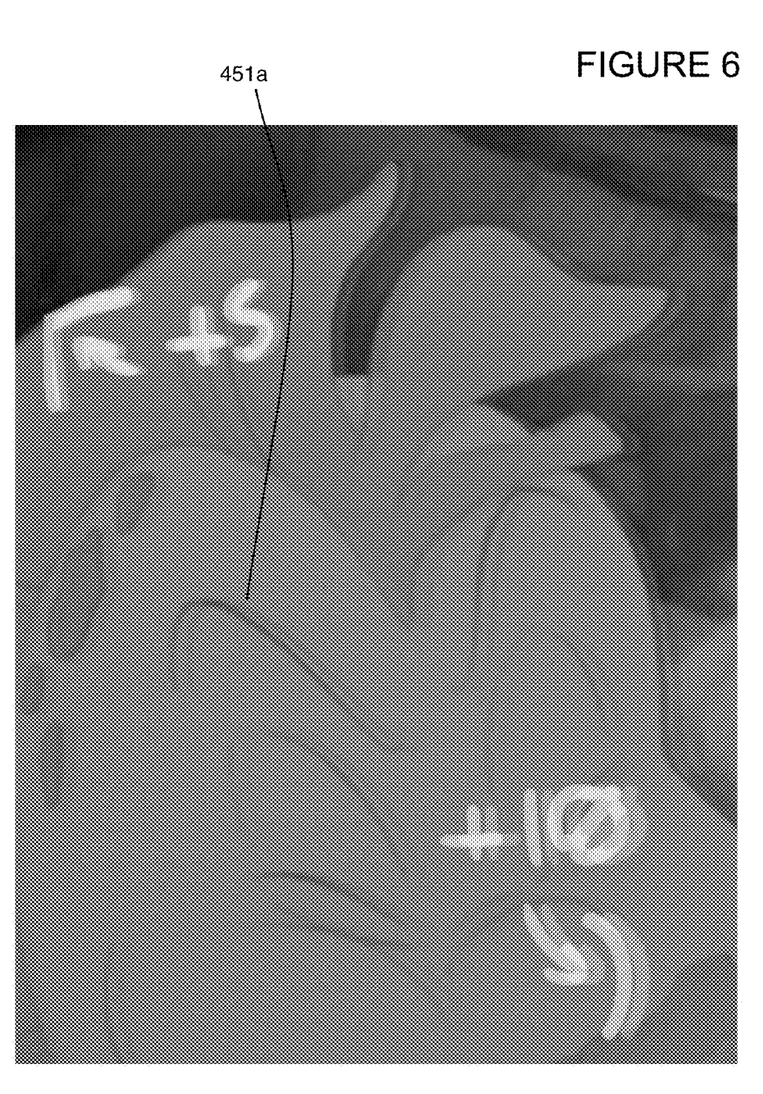
FIG. 6 illustrates a close up view of a portion of a line on the region wherein the line does not match the depth of the region but rather implies a depth for the human mind to interpret for the region.

FIG. 6 illustrates a close up view of a portion of a line on the region wherein the line does not match the depth of the region but rather implies a depth for the human mind to interpret for the region. As shown in close up, line 451a is of a depth that does not necessary correspond to the shape of, or the depth of the region in which the line resides.

Figure 7:
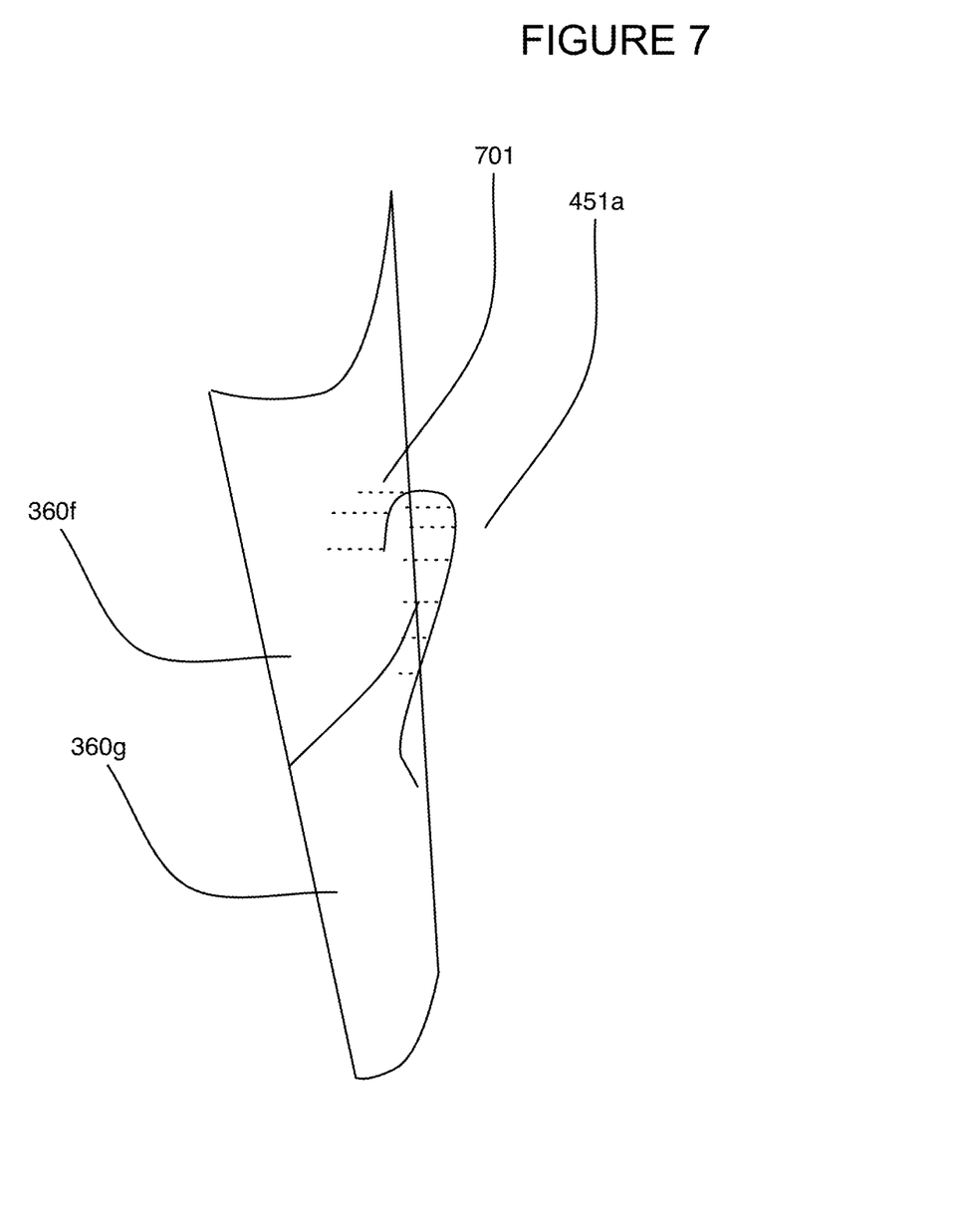
FIG. 7 illustrates a side view of the depth of the region and line shown in FIGS. 4-6.

FIG. 7 illustrates a side view of the depth of the region and line shown in FIGS. 4-6 wherein line 451a has had a depth added to portions of the line to offset line 451a from regions 360f and 360g in which the line appears. As shown by dotted depth indicators 701 for illustrative purposes, the depth of line 451a has been offset from regions 360f and 360g in order to give regions 360f and 360g an implied depth without requiring modeling of the underlying region with wireframe models, etc. This method may be applied to a line that lies in one region or multiple regions as described for exemplary purposes. This enables an extremely fast method for providing one or more regions with implied depth without requiring extensive depth modeling for the region or regions. For example region 360f may have a simple curve or other depth offset applied as is shown in the exemplary side view of FIG. 7 while the depth of line 451a is adjusted with a slightly larger mask than the line so as to imply depth to the region. Given the underlying regions of a single or nearly single color, any masking errors are basically undetectable to the human eye as the shifted over-masked area falls on the same color background when shifted horizontally for left and right eye stereoscopic viewing. The human eye believes the entire region to be at the depth contour provided by the line, however the amount of labor required to add depth to the image is greatly lowered with embodiments of the invention. See also FIG. 6 with anaglyph glasses to view the lines at a different depth than the background.

Figure 8:
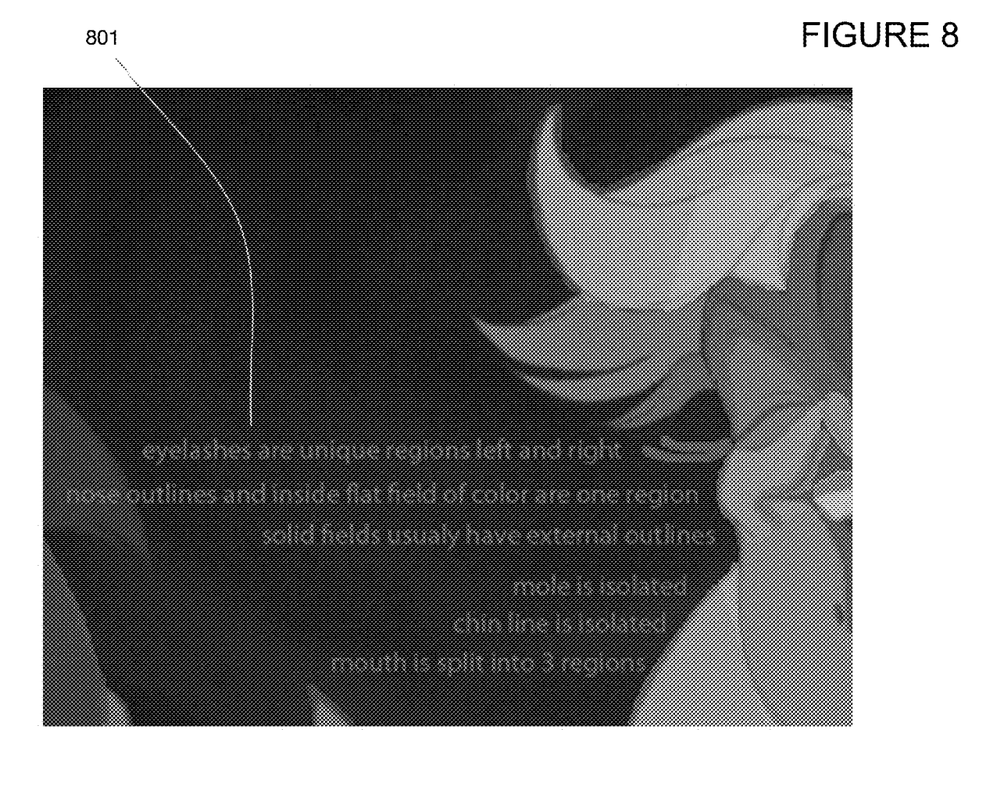
FIG. 8 illustrates an example of a style guide for use in the creation of lines and other regions.

FIG. 8 illustrates an example of a style guide for use in the creation of lines and other regions, e.g., the eyelashes, the mole, the chin, etc. As shown, the instructions 801 for augmenting lines with depth are shown for example in a key frame. The instructions are then utilized to focus work on the lines that depth may be added to in order to minimize work, for example to minimize modeling of the regions having lines. This enables consistent work product to be generated for a particular scene and further lowers the amount of effort that is performed in augmenting a scene with depth.

As illustrated, embodiments of the invention minimize the amount of work required to generate depth associated with lines for areas without requiring complex modeling of the areas and enable the lines to be altered without complex remodeling or re-rendering.

While the invention herein disclosed has been described by means of specific embodiments and applications thereof, numerous modifications and variations could be made thereto by those skilled in the art without departing from the scope of the invention set forth in the claims.

What is claimed is:

1. A three-dimensional annotation method performed by a computer system for conversion of two-dimensional images to three-dimensional images comprising:
obtaining a two-dimensional source image;
displaying said two-dimensional source image on a screen associated with a first computer;
accepting a mask having an area associated with a line in a monochrome region in said two-dimensional source image;
accepting a depth associated with said line within said monochrome region in said two-dimensional source image via an input device coupled with said first computer;
applying said depth to said line of said area of said mask in said two-dimensional image to create a three-dimensional image without altering a depth of a remainder of the monochrome region where said line of said area of said mask does not occur.

2. The method of claim 1 wherein said input device comprises a graphics tablet, mouse, keyboard or microphone or any combination thereof and wherein said accepting said mask or accepting said depth or both, comprises accepting input from said graphics tablet, or said mouse, or said keyboard, or said microphone or any combination thereof.

3. The method of claim 1 wherein said accepting said mask further comprises:
   accepting an input location within said two-dimensional source image;
   obtaining a color of a pixel at said input location;
   increasing said area of said mask to include all contiguous pixels that are within a predetermined range of said color of said pixel.

4. The method of claim 3 further comprises setting said predetermined range of said color to a predetermined percentage of a volume of a color space.

5. The method of claim 3 further comprises setting said predetermined range of said color to a predetermined threshold of luminance associated with said color.

6. The method of claim 3 further comprises setting said predetermined range of said color to zero so that contiguous pixels have said color to be included in said area of said mask.

7. The method of claim 3 wherein said increasing said area of said mask further comprises:
   increasing said area of said mask by a predetermined number of pixels.

8. The method of claim 2 wherein obtaining said depth comprises analyzing motion data obtained from said graphics tablet or mouse, or parsing alphanumeric data from said keyboard to determine said depth.

9. The method of claim 1 wherein obtaining said depth comprises analyzing annotations associated with said mask.

10. The method of claim 1 wherein obtaining said depth comprises asserting voice recognition software.

11. The method of claim 1 wherein said applying said depth to said area of said mask in said two-dimensional image to create a three-dimensional image comprises generating a pair of images comprising an image for viewing with a left and right eye respectively.

12. The method of claim 1 wherein said applying said depth to said area of said mask in said two-dimensional image to create a three-dimensional image comprises generating an anaglyph image.

13. The method of claim 1 wherein said applying said depth to said area of said mask in said two-dimensional image to create a three-dimensional image comprises generating an polarized image.

14. The method of claim 1 wherein said applying said depth to said area of said mask in said two-dimensional image to create a three-dimensional image comprises generating single image capable of displaying differing depths.

15. The method of claim 1 further comprising:
   displacing at least said area of said mask in said two-dimensional source image left and right based on said depth to create said three-dimensional image.

16. A three-dimensional annotation method performed by a computer system for conversion of two-dimensional images to three-dimensional images comprising:
   obtaining a two-dimensional source image;
   displaying said two-dimensional source image on a screen associated with a first computer;
   accepting a mask having an area associated with a line in a monochrome region in said two-dimensional source image via an input device coupled with said first computer wherein said input device comprises any combination of graphics tablet, mouse, keyboard or microphone;
   accepting a depth associated with said line within said monochrome region in said two-dimensional source image via an input device coupled with said first computer wherein said accepting said depth comprises accepting input from said graphics tablet, or said mouse, or said keyboard, or said microphone or analyzing annotations associated with said mask or any combination thereof;
   applying said depth to said line of said area of said mask in said two-dimensional image to create a three-dimensional image without altering a depth of a remainder of the monochrome region where said line or said area of said mask does not occur.

17. The method of claim 16 wherein said accepting said mask further comprises:
   accepting an input location within said two-dimensional source image;
   obtaining a color of a pixel at said input location;
   increasing said area of said mask to include all contiguous pixels that are within a predetermined range of said color of said pixel.

18. The method of claim 17 further comprises setting said predetermined range of said color to a predetermined percentage of a volume of a color space or a predetermined threshold of luminance associated with said color.

19. The method of claim 17 wherein said increasing said area of said mask further comprises:
   increasing said area of said mask by a predetermined number of pixels.

20. The method of claim 16 further comprising:
   displacing at least said area of said mask in said two-dimensional source image left and right based on said depth to create said three-dimensional image.

* * * * *